Jan. 5, 1926. 1,568,717
W. G. R. BRAEMER
AIR CONDITIONING APPARATUS
Filed Sept. 10, 1923  2 Sheets-Sheet 1
FIG. 1.
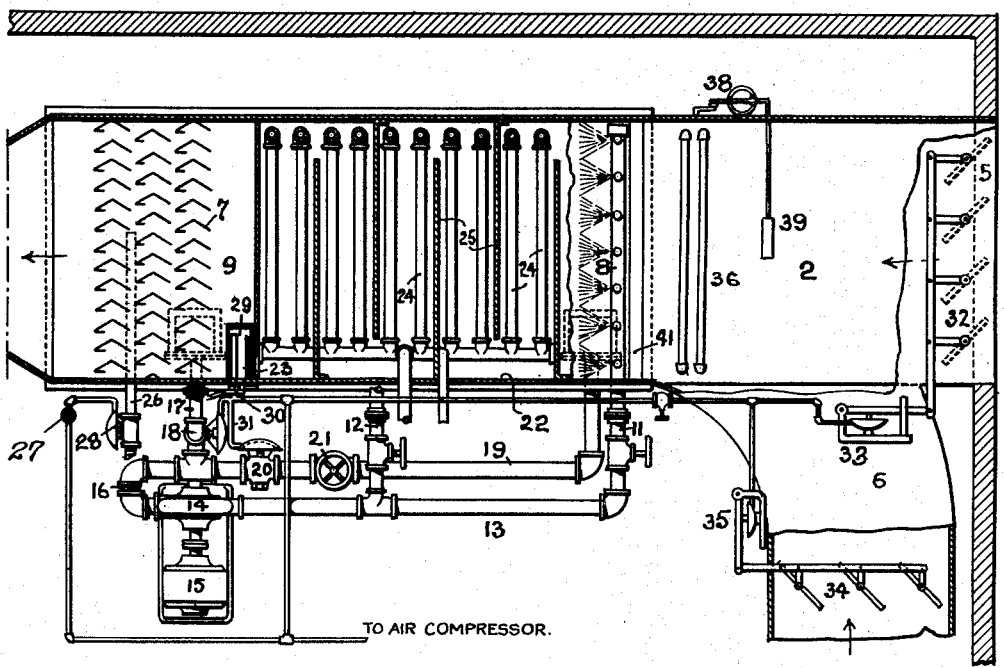
FIG. 2
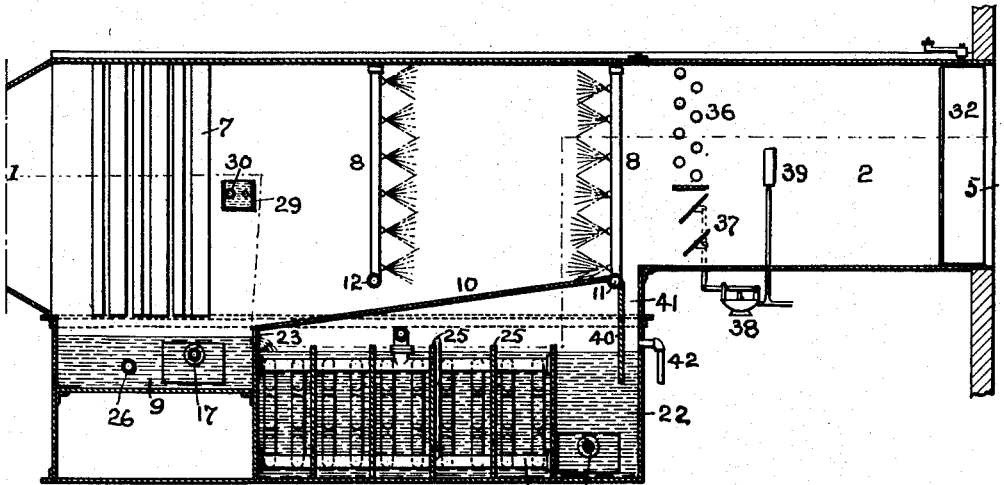
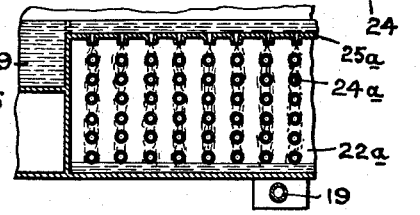
FIG. 6
INVENTOR
William G. R. Braemer
BY 
ATTORNEY Jan. 5, 1926.  
W. G. R. BRAEMER  
1,568,717  
AIR CONDITIONING APPARATUS  
Filed Sept. 10, 1923  2 Sheets-Sheet 2
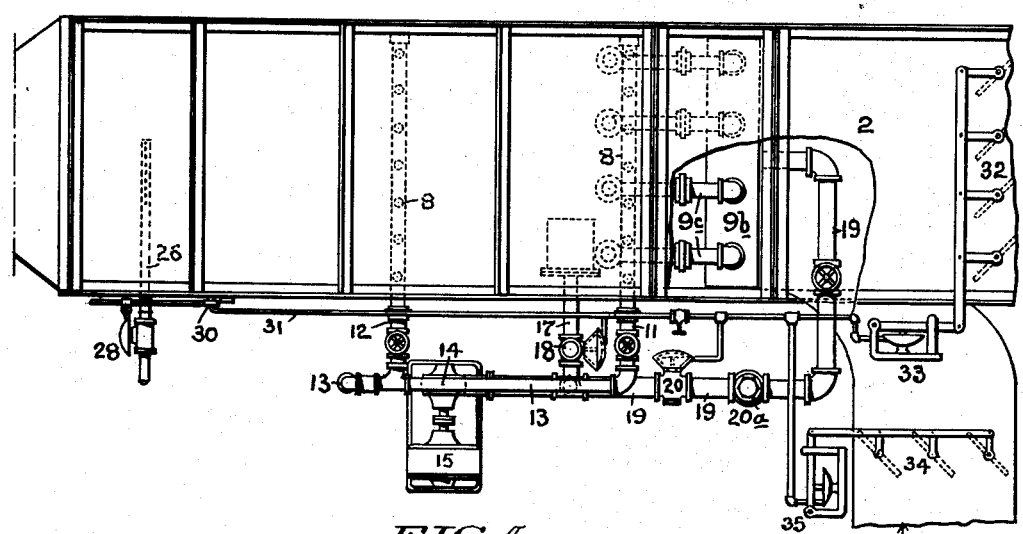
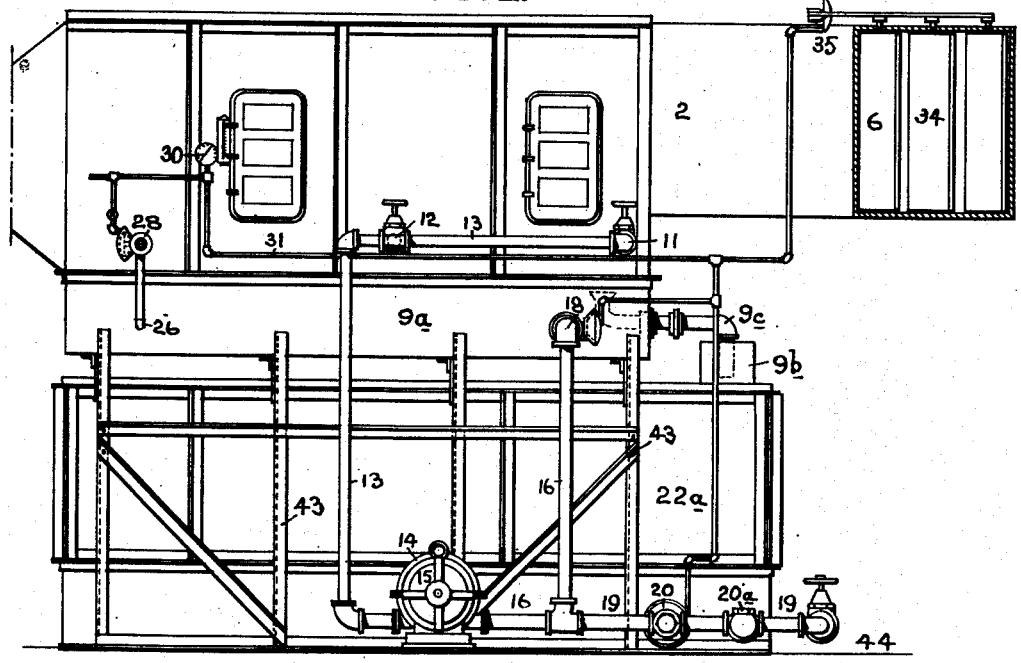
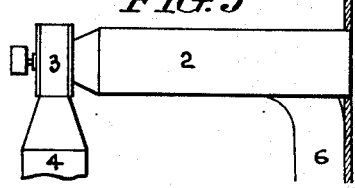
INVENTOR  
William G. R. Braemer  
BY  
ATTORNEY Patented Jan. 5, 1926.

1,568,717

UNITED STATES PATENT OFFICE.

WILLIAM G. R. BRAEMER, OF CRANSTON, RHODE ISLAND, ASSIGNOR TO AMERICAN MOISTENING COMPANY, A CORPORATION OF MAINE.

AIR-CONDITIONING APPARATUS.

Application filed September 10, 1923. Serial No. 661,793.

*To all whom it may concern:*

Be it known that I, WILLIAM G. R. BRAEMER, a citizen of the United States, and resident of Cranston, county of Providence, and State of Rhode Island, have invented an Improvement in Air-Conditioning Apparatus, of which the following is a specification.

The object of my invention is to provide improved apparatus for treating air for buildings and other purposes, wherein its humidity condition may be controlled so that air taken from outside of a building, alone or in association with recirculated air, may be treated to sprays or vapors whose temperature is automatically controlled for raising or lowering the dew point temperature of the air being treated, whereby moisture may be definitely added to the circulating air to increase the absolute moisture content to provide a condition which will insure a predetermined relative humidity at place of use, or in which the treated air may be dehumidified to a predetermined relative humidity condition, whereby the apparatus is suitable for use to meet both winter and summer conditions.

With the above and other objects in view, the nature of which will be more fully understood from the description hereinafter, the invention consists in the novel construction of air conditioning apparatus, as hereinafter more fully described and defined in the claims.

Referring to the drawings: Fig. 1 is a horizontal sectional view of an air conditioning apparatus embodying my invention, taken on line 1—1 of Fig. 2; Fig. 2 is a vertical sectional view of Fig. 1; Fig. 3 is a plan view of a modified form of my improved air conditioning apparatus with a portion broken away; Fig. 4 is a side elevation of the same; Fig. 5 is a diagrammatic plan view illustrating the general lay out of the apparatus including the blower; and Fig. 6 is a sectional view of a portion of cooling apparatus which may constitute a modification of the cooling apparatus of Figs. 1 and 2.

2 is the air trunk or casing through which the air to be conditioned is caused to pass. One end of this casing opens through the wall of the building at 5 for receiving fresh air, the entrance of which may be controlled by dampers 32. The other end of the passage is in communication with the suction port of a blower 3 which delivers the humidified air to a conduit 4 (Fig. 5) leading to the room or place of delivery. Part of the air from the room or place of delivery may be returned by a conduit 6 and re-circulated through the air trunk or casing 2, being mixed with fresh air which enters the inlet port 5. The air casing 2 is shown as provided with two sets of spray nozzles, carried by suitable piping indicated at 8, the nozzles of each set being preferably directed in an opposed relation, so that they provide a dense mist in a definite portion of the length of the casing or trunk 2, constituting a spray chamber through which the air is caused to pass under the action of the blower. Intermediate of the said spray nozzles 8 and the blower 3 are arranged eliminators 7 of any suitable type. As shown, these eliminators are vertical plates of angular cross section and arranged in staggered relation so as to be adapted to remove the surplus or entrained water which is carried by the air current, said removed water flowing downward upon the eliminator plates and received in a tank 9 arranged below the eliminators. Any other form of eliminator may be employed, if so desired. The floor of the spray chamber 2 below the spray nozzles 8 is inclined as at 10, so as to discharge any water, derived from said spray nozzles, into the tank 9 adjacent to the eliminators. The surplus water received in the tank 9 may pass by an overflow port 23 at one end of the tank, into a second tank 22 which is provided with cooling coils 24. These cooling coils are associated with oppositely directed plates 25 extending from the side walls of the tank 22, so that the water flowing through the port 23 is caused to flow back and forth in a sinuous direction about the coils in reaching the distant end of the tank, said end being in communication with the suction pipe 19. In this manner, the water is more thoroughly subjected to the action of the cooling coils than if the oppositely directed plates 25 were omitted. The cooling coils 24 may be cooled by the circulation through them of artesian well water, or by a refrigerating medium provided in any well known manner. A vertical plate 40 is shown as extending downward from the higher end of the floor 10 of the passage and dipping into the water within the tank 22 and providing thereby a vertical air passage 41 to tank 22 which prevents any sluggishness in the outflow of the water through the suction pipe 19 due to the tank being more or less sealed in case of an excess of water passing through the port 23. 42 is an overflow pipe which prevents the water in the tank 22 rising above a predetermined level.

While the tank 22 is provided with means for cooling the water received by it, the tank 9 is provided with means for heating the water within it. In this latter case, 26 is a perforated steam pipe for delivering steam into the water for heating it, the steam passing through said pipe being controlled by a diaphragm motor valve 28 which is itself controlled by a thermostat 30 in the air trunk between the spray nozzles 8 and eliminators and thereby affected by the dew point temperature of the saturated air. The thermostat 30 is preferably arranged in a small open tank 29 which is kept full of water during the normal operation of the apparatus, said water derived from the suspended water in the air just prior to its entering the eliminators.

Referring more particularly to the thermostat 30, it may be made in any suitable manner, but is affected by the temperature of water in the tank 29 and which is directly derived from the air after being subjected to the vapor of the spray nozzles 8 and preferably immediately before reaching the eliminators, and by reason of which conditions the temperature of the water in said tank 29 is the same temperature as the humidified air from which it is precipitated. The tank being relatively small, it follows that during the normal operation of the apparatus, it remains full, any surplus flowing over and downward as waste to the eliminator tank 9. By this means, steam is turned on into the water in case of a drop in temperature of the air or lowering of its dew point and is automatically shut off whenever the dew point temperature rises to or above the predetermined dew point temperature for which the apparatus is adjusted. The thermostat may be of any suitable character so long as it is capable of maintaining the temperature of the water in the tank at any predetermined degree. These automatic heating devices for the water for maintaining it at a substantially constant temperature are employed when the humidifying apparatus is used in cold weather, such as in winter, when the spray water is to be heated above atmospheric temperature for inducing the air to take up or absorb a greater quantity of moisture to a point of saturation at a predetermined temperature, the humidified air being subsequently heated to raise its temperature and lower its relative humidity to the percentage required before being delivered to the room or place of use in the usual manner. A suction pipe 17 enters this tank 9 below the eliminators and may be employed to supply water to the pump 14 when the spray water from the nozzles is to be supplied from the warm water of said tank.

It will be understood that when the air is brought to a condition of saturation at any given temperature, the air will contain a definite quantity of moisture and the temperature at which it will precipitate moisture is its dew point temperature. For practical purposes, this dew point temperature may be considered the temperature of the saturated air immediately after it leaves the spray chamber and before reaching the eliminators. It may also be accepted that the temperature of the water suspended in or entrained with the air is the same as the air itself, consequently a thermostat affected by the moisture of the air may be employed to maintain the constancy of the dew point temperature. For practical purposes, I, therefore, provide a small tank 29 within the air passage between the sprays and eliminators which is constantly receiving precipitated moisture from the air before reaching the eliminators and, therefore, provides a water bath for the thermostat 30 which makes it responsive to any changes in the water temperature and therefore to the dew point temperature of the air. As the tank 29 is arranged well up in the path of the main current of the air, the temperature of the water collected therein is a fair indication of the average temperature of the air itself and can be relied upon as a basis for humidity control. As it is instantly responsive to any changes in the air temperature, the control induced thereby is quick and accurate and operates to prevent any very material changes of the dew point, its constancy between very narrow limits being thereby insured. When the dew point conditions are insured, it only remains for the reheating of the air before delivering it to the room or place of use, to lower its relative humidity to the degree required, said operation being preferably under automatic control of the humidity conditions of the room, these features being well understood and will need no further explanation.

In summer, when it is desired to dehumidify the air, the water for the spray nozzles is drawn from the tank 22 through the suction pipe 19. It is also to be understood that when the water circulation for the sprays is taken from the tank 9, the cooling coils in the tank 22 are shut off and, similarly, when the cooling coils of the tank 22 are to be employed (as during the summer), the heating means for the tank 9 are out of action, this being accomplished by closing valve 27 in the compressed air pipe leading to the automatic valve 28. In this connection, I have, therefore, provided automatic means for insuring the temperature of the water for operating the sprays whether it be taken from the tank 9 or the tank 22, according to the varying temperature conditions of the atmosphere, as in summer and winter.

14 is a circulating and pressure pump and may be driven by an electric motor 15, the discharge side of said pump opening into a pressure main 13 from which branches 11 and 12 are provided for the respective sets of spray nozzles 8, 8. These branch pipes 11 and 12 extend horizontally near the floor 10 of the spray chamber and support the vertical pipes to which the spray nozzles are attached. Suitable valves may be provided in said branching pipes, so that either set of spray nozzles may be shut off at will. The suction port of the pump 14 communicates with a pipe 16 from which two suction pipes 17 and 19 extend, the suction pipe 17 communicating with the tank 9 and the suction pipe 19 communicating with the tank 22, as before stated. The branch pipe 17 is provided with an automatic control valve 18 and branch pipe 19 is similarly provided with an automatic control valve 20; and said valves are so made that when the valve 20 is open, the valve 18 is closed and vice versa. In this manner, the suction of the pump 14 draws the water from either the tank 9 or tank 22, as the case may be, but never from both tanks at the same time. The valves 18 and 20 are controlled by a thermostat 30, the same controlling the compressed air in pipes 31 leading to the said automatic valves to operate them.

During the operation in summer, the valve 20 may be closed and valve 18 maintained in open condition and varying temperature in the tank 9 above relied upon; or, if desired, both valves 18 and 20 may be allowed to operate automatically according to whether warmer or cooler water for sprays are required. Assuming the tank 22 to be merely acting as a reservoir of cooler water than in tank 9 (but not refrigerated) it may be employed to supply spray water when the dew point temperature rises above the predetermined temperature, and tank 9 and heater 26 employed for spray water when the dew point temperature becomes lowered below the predetermined temperature.

While heating means is especially provided for heating the water in the tank 9 during the colder or winter months, the heating means may be employed for maintaining a constant temperature above normal temperature of water at any other time of the year when circumstances may require such heating to be provided for.

Considering the operation of the apparatus for dehumidifying during the hot summer months and when the normal atmosphere contains an excess of humidity, it will then be understood that the apparatus might be considered as operating as an air washer with the circulation of the water for the spray taken from the tank 9 and with the automatic valve 18 open and valve 20 closed. In this case, the heating means 26 and 28 for the tank 9 are shut off by valve 27 in the air pipe and the water temperature is allowed to be that of the spray water from the nozzles 8 after being modified by contact with the warmer air. After the water is received in the tank 9 from the floor 10 and eliminators 7, it is caused to circulate through the cooler tank 22 wherein it is cooled to the desired degree before being supplied to the pump by suction pipe 19. Assuming that the air is being brought to a condition of saturation corresponding to a predetermined dew point temperature, then should such temperature rise the thermostat 30 will respond causing valve 18 to close and valve 20 to open and the sprays 8 are then derived from the cooled water of tank 22 and reduce the air temperature to the desired dew point. If the dew point temperature should fall below the predetermined temperature, then the thermostat 30 will cause the valve 18 to open and valve 20 to close, with the result that the sprays 8 will receive supply from the warmer water of tank 9 and thus raise the temperature of the air to the predetermined degree. In this manner, the air is maintained at such a temperature that at saturation it will only hold the minimum of moisture desired, all in excess thereof being precipitated and, to that extent, the air is dehumidified.

In Figs. 1 and 2, the fresh air enters the air trunk of conduit 2 through the passage 5, controlled by dampers 32 which may be automatically operated by a motor 33 under control of the thermostat 30; and where the fresh air is to be mixed with re-circulated air led in from the flue 6, the latter may be controlled by dampers 34 automatically operated by a motor 35 also controlled by the thermostat 30. The admixture of the fresh and re-circulated air provides a means of controlling the temperature of the air before being subjected to the sprays. 36 represent tempering coils and 37 a by-pass about them for the air before being acted on by the spray and the by-pass is provided with dampers operated by a motor 38 controlled by a thermostat 39 in the air trunk 2 and acted on by the temperature of the air before it reaches the tempering coils. These coils would only be employed in the cold weather and when humidification of the air was desired.

In Figs. 1 and 2, the cooling tank 22 is built in as an integral part of the air trunk and other portions of the apparatus and is, therefore, more or less difficult of access for repairs. In Figs. 3 and 4, I have shown a more desirable construction in which the inclined floor 10 is omitted and the tank 9 extended below the spray nozzles, as indicated at 9ª, Fig. 4. The air trunk 2, spray pipes, tank 9ª and associated parts are supported in an elevated position upon a framework 43 to provide below the tank 9ª ample space for the cooling or refrigerating tank 22ª which may (after disconnection) be withdrawn wholly or to such an extent as to permit access to its interior when necessary. The water supplied to the cooling tank 22ª is received by overflow pipes 9ᶜ extending from tank 9ª and discharging into a receiving box 9ᵇ from which the water passes to the cooling means. The water pump 14 has the same connections with the tanks 9ª, 22ª and nozzles 8 as is provided in the construction shown in Figs. 1 and 2 and no further description of them will be required.

In the construction of cooling apparatus shown in Figs. 1 and 2, the cooling coils 24 are wholly submerged in the circulating water which almost fills the tank 22, but I do not confine myself to any particular means for cooling the water and have shown, in Fig. 6, an alternative form by way of example. In this figure, the upper portion of the tank 22ª is provided with a perforated diaphragm or floor 25ª, over which the water from the tank 9 flows and from the apertures in which it runs, falling upon chilled or cooling pipes 24ª through which the cooling medium flows. The water flowing over the pipes 24ª thus becomes cooled and passes to the suction pipe 19 leading to the pump 14 as previously explained.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:

1. In an air conditioning apparatus, the combination of an air passage for supplying air to a place of use, means for causing a current of air to flow through the passage, means for spraying water into the passage for substantially saturating the air passing therethrough with moisture, eliminators in the passage for removing the suspended or entrained moisture in the air after subjection to the water sprays, means for varying the temperature of the spray water before being sprayed to compensate inversely for variations in temperature of the air being treated whereby the air temperature may be maintained substantially constant, and thermostatic means for controlling the temperature changing means for the temperature of the spray water, the same including a thermostat arranged in the air passage between the spraying means and the eliminators and subjected to water having the temperature of the sprayed moisture suspended or entrained in the air before removal by the eliminators, and wherein further, the thermostat in the air passage between the spraying means and the eliminators comprises a suspended water vessel open at its top, and a thermostatic element arranged within the vessel and constantly submerged in the water contained therein, said vessel surrounded by moist air and receiving its water from the moisture suspended or entrained in the air which passes over and in contact with its upper surface.

2. In an air conditioning apparatus, the combination of an air passage for supplying air to a place of use, means for causing a current of air to flow through the passage, means for spraying water into the passage for substantially saturating the air passing therethrough with moisture, eliminators in the passage for removing the suspended or entrained moisture in the air after subjection to the water sprays, means for varying the temperature of the spray water before being sprayed to compensate inversely for variations in temperature of the air being treated whereby the air temperature may be maintained substantially constant, and thermostatic means for controlling the temperature changing means for the temperature of the spray water, the same including a thermostat arranged in the air passage between the spraying means and the eliminators and subjected to water having the temperature of the sprayed moisture suspended or entrained in the air before removal by the eliminators, and wherein further, the means for spraying the water comprises spray nozzles, a pump for forcing the water through the nozzles, two sources of water of different temperatures from which the pump is alternately supplied, and valve means controlled by the thermostatic means located in the air passage between the spray nozzles and the eliminator and at a point wherein the air is substantially saturated with moisture for determining the source of water supply which is to be put into communication with the pump at any moment of time to compensate for temperature variations of the humidified air.

3. In an air conditioning apparatus, the combination of an air passage for supplying air to a place of use, means for causing a current of air to flow through the passage, nozzles for spraying water into the passage for substantially saturating the air passing therethrough with moisture, a pump for forcing the water through the nozzles, eliminators in the passage for removing the suspended or entrained moisture in the air after subjection to the water sprays, means for varying the temperature of the spray water to compensate inversely for variations in temperature of the air being treated whereby the air temperature may be maintained substantially constant, thermostatic means for controlling the temperature changing means for the temperature of the spray water and including a thermostat arranged in the air passage between the spraying means and the eliminators and subjected to the temperature of the moisture suspended or entrained in the air before removal by the eliminators, two sources of water of different temperatures from which the pump is alternately supplied, and valve means controlled by the thermostatic means for determining the source of water supply which is to be put into communication with the pump at any moment of time to compensate for temperatur variations of the humidified air, and wherein further, one of the sources of water supply is a tank in which the water received from the eliminators and spray chamber with additional water is received, and the other of the sources comprises a separate tank in which the water from the said first stated source is further reduced in temperature by cooling means.

4. The invention according to claim 3, wherein the air passage, spraying means, eliminators, and tank receiving the water from the eliminators and spray chamber are supported upon a frame whereby they are suspended at an elevation above the floor, and in which the tank with its cooling means is arranged within the frame and detachably positioned below the apparatus above enumerated as suspended upon the frame, and connecting means for transferring the water collected in the first mentioned tank to the last mentioned tank having the cooling means.

5. The invention according to claim 3, wherein further, the separate tank provided with the cooling means is detachably positioned beneath the other tank receiving the water from the eliminators whereby it may be removed for permitting access to its interior.

In testimony of which invention, I hereunto set my hand.

WILLIAM G. R. BRAEMER.